US012146763B2

(12) United States Patent
Kuehnel et al.

(10) Patent No.: US 12,146,763 B2
(45) Date of Patent: Nov. 19, 2024

(54) INERTIAL SENSOR AND COMPUTER-IMPLEMENTED METHOD FOR SELF-CALIBRATION OF AN INERTIAL SENSOR

(71) Applicant: Robert Bosch GmbH, Stuttgart (DE)

(72) Inventors: Matthias Kuehnel, Boeblingen (DE); Wenqing Liu, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 805 days.

(21) Appl. No.: 17/032,672

(22) Filed: Sep. 25, 2020

(65) Prior Publication Data

US 2021/0095995 A1 Apr. 1, 2021

(30) Foreign Application Priority Data

Sep. 30, 2019 (DE) .......................... 102019214984.7

(51) Int. Cl.
*G01C 25/00* (2006.01)
*G01C 19/5726* (2012.01)
(Continued)

(52) U.S. Cl.
CPC ....... *G01C 25/005* (2013.01); *G01C 19/5726* (2013.01); *G01P 21/00* (2013.01);
(Continued)

(58) Field of Classification Search
CPC .. G01C 25/005; G01C 19/5726; G06N 3/045; G06N 3/02; G01P 21/00; G05B 13/027; G05B 13/029; G05B 19/404
See application file for complete search history.

(56) References Cited

U.S. PATENT DOCUMENTS

2005/0069925 A1* 3/2005 Ford .................... A61B 5/4266
702/20
2012/0065746 A1* 3/2012 Wintrich ................... F23N 5/00
700/48

(Continued)

FOREIGN PATENT DOCUMENTS

DE 102019111041 A1 * 10/2020

OTHER PUBLICATIONS

Rita Fontanella et al., "MEMS Gyros Temperature Calibration Through Artificial Neural Networks," Sensors and Actuators A: Physical, vol. 279, 2018, pp. 553-565.

*Primary Examiner* — Behrang Badii
*Assistant Examiner* — Jay Khandpur
(74) *Attorney, Agent, or Firm* — NORTON ROSE FULBRIGHT US LLP; Gerard A. Messina

(57) ABSTRACT

A computer-implemented method for the self-calibration of an inertial sensor. The method includes: establishing data that relate to the inertial sensor; subdividing the data into training data and test data; setting a first target accuracy value for a first artificial neural network that includes linear activation functions; training the first artificial neural network using the training data; inputting the test data into the trained first artificial neural network in order to obtain a first output value of the first artificial neural network; establishing a first output accuracy value based on a comparison result between the first output value and the test data; storing weightings and the linear activation functions of the first artificial neural network in a memory unit of the inertial sensor if the first output accuracy value is greater than the first target accuracy value, or otherwise, training the first artificial neural network again using the training data.

9 Claims, 5 Drawing Sheets

(51) Int. Cl.
  *G01P 21/00*   (2006.01)
  *G05B 13/02*   (2006.01)
  *G05B 19/404*  (2006.01)
  *G06N 3/02*    (2006.01)
  *G06N 3/045*   (2023.01)

(52) U.S. Cl.
  CPC ......... *G05B 13/027* (2013.01); *G05B 13/029* (2013.01); *G05B 19/404* (2013.01); *G06N 3/02* (2013.01); *G06N 3/045* (2023.01)

(56) References Cited

U.S. PATENT DOCUMENTS

| | | |
|---|---|---|
| 2015/0121990 A1 | 5/2015 | Bauer et al. |
| 2017/0158347 A1 | 6/2017 | Anderson et al. |
| 2019/0034762 A1* | 1/2019 | Hashimoto .......... G06V 10/764 |
| 2019/0303760 A1* | 10/2019 | Kumar .................. G06V 20/69 |
| 2021/0303818 A1* | 9/2021 | Randolph .............. G06N 5/045 |
| 2021/0374528 A1* | 12/2021 | Okuno ............... G06V 10/7715 |

* cited by examiner

INERTIAL SENSOR AND COMPUTER-IMPLEMENTED METHOD FOR SELF-CALIBRATION OF AN INERTIAL SENSOR

CROSS REFERENCE

The present application claims the benefit under 35 U.S.C. § 119 of German Patent Application No. DE 102019214984.7 filed on Sep. 30, 2019, which is expressly incorporated herein by reference in its entirety.

FIELD

The present invention relates to a computer-implemented method for the self-calibration of an inertial sensor. The present invention also relates to an inertial sensor for carrying out the method, to a computer program and to a computer-readable medium.

BACKGROUND INFORMATION

The sensitivity of inertial sensors is typically not constant, but rather deviates from the setpoint value after soldering and during the entire operating life due to fluctuations of the mechanical and thermal loads. The relationship between the sensor output value and the sensor input value, in particular, changes, which results in the inaccuracy of the sensor measurements. After the installation of microsystem devices ("microelectromechanical system devices" or "MEMS devices"), which include inertial sensors, in target products such as, for example, smartphones, drones, an accurate characterization and correction of the sensitivity of the inertial sensors by the customer using specialized test stands is usually no longer possible, because the customers very seldom have access to dedicated specialized test stands.

The detection sensitivity of an inertial sensor describes an electrical response to a physical stimulation such as, for example, the rotational rate or yaw rate of a gyroscope or the acceleration rate of an accelerometer. The sensitivity of electrical test signals describes an electrical response to electrical test signals. The two aforementioned sensitivities are two different measures, but are closely interrelated. The variation of the detection sensitivity of an inertial sensor is caused mainly by geometrical and structural changes in the structure of a microsystem, for example, by a change in the spacing between the electrodes and the sensor element.

In multi-axial gyroscopes, for each axis of which at least one pair of test electrodes is implemented, it is possible to determine the variation of the electrical sensitivity of the test signal for each axis. It has been provided to apply a linear adaptation of the first order in order to estimate the sensitivity variance for each axis. The linear adaptation is easy to implement. However, it has a low accuracy and is unable to model the non-linear distortions.

In order to treat non-linear behaviors, methods of machine learning may be applied. One approach for mapping the calibration of the thermal pre-stressing of microsystem gyroscopes is described in the article "MEMS gyros temperature calculation through artificial neural networks" by Rita Fontanellaa et al.

Linear adaptations are limited in their complexity. They are therefore unsuitable for being used to learn complex functional correlations between data. If a linear function of the relationship between input and output is unable to be reasonably approximated, the model shows a poor prediction. In conventional artificial neural networks ("ANN"), non-linear activation functions are normally used. Efficient approximations are possible with these artificial neural networks, with which complex and complicated form data of every type may be calculated and learned. They represent non-linear arbitrary mappings between inputs and outputs. If, however, the number of inputs and/or layers increases, the outputs may suffer from undesirable overfitting, which results in a serious deterioration of the accuracy of the sensor measurements.

As shown in FIG. 2, for example, a comparison of distributions 80, 90 of the final sensitivity of an inertial sensor is shown, which has been corrected using a linear adaptation function whose approximated distribution 80 is shown by a dashed line, and an artificial neural network having a non-linear activation function, whose approximated distribution 90 is shown by a solid line. From a statistical perspective, both distributions are symmetrical and unimodal. Distribution 80 with the average value of 1.0 has a lower probability density and a narrower total range, whereas distribution 90 with the average value has a higher value (see difference 91 shown) but with a larger total range due to outliers 92 that have been caused by the overfitting. The higher score of distribution 90 with the average value is the expected improvement achieved by the non-linear activation functions.

U.S. Patent Application Publication No. US 2015/0121990 A1 describes a yaw rate sensor, including a movable mass structure, a drive component, which is suitable for setting the movable mass structure in motion, and an analysis component, which is suitable for detecting the response of the movable mass structure to a yaw rate.

SUMMARY

The present invention provides a computer-implemented method for the self-calibration of an inertial sensor, an inertial sensor for carrying out the method, a computer program, and a computer-readable medium.

Advantageous refinements of the present invention are described herein.

According to one first aspect, the present invention relates to a computer-implemented method for the self-calibration of an inertial sensor. In accordance with an example embodiment of the present invention, the method includes the following steps: establishing data that relate to the inertial sensor; subdividing the data into training data and test data; setting a first target accuracy value for a first artificial neural network that includes linear and/or non-linear activation functions; training the first artificial neural network using the training data; inputting the test data into the trained first artificial neural network in order to obtain a first output value of the first artificial neural network; establishing a first output accuracy value based on a comparison result between the first output value and the test data; storing weightings and the linear and/or non-linear activation functions of the first artificial neural network in a memory unit of the inertial sensor if the first output accuracy value is greater than the first target accuracy value, or training the first artificial neural network again using the training data if the first output accuracy value is lower than the first target accuracy value; establishing an upper limitation value and a lower limitation value for a second artificial neural network that includes non-linear activation functions, based on a predefined constant and on the first output value of the first artificial neural network; training the second artificial neural network using the training data; inputting the test data into the trained second artificial neural network in order to obtain a second output value of the second artificial neural network; comparing the second output value of the second artificial neural network with a value range from the upper limitation value to the lower limitation value; establishing a third output value on the second output value if the second output value is within the value range, or on the first output value if the second output value is not within the value range; and storing weightings and the non-linear activation functions of the second artificial neural network and the predefined constant in the memory unit.

According to the present invention, a data-based method is provided for estimating the sensitivity error or the inaccurate sensitivity of an inertial sensor. With the example method according to the present invention, specifically, with the use of the upper limitation value and of the lower limitation value, the undesirable overfitting in the related art is effectively prevented. The cooperation according to the present invention of the first and of the second artificial neural networks and the strategy according to the present invention with respect to the decision for the output values of the two neural networks result in an improved correction or calibration of the sensitivity of the inertial sensor.

According to the present invention, it is advantageous, when signals are detected by the inertial sensor, that with the design of the first and second artificial neural networks, the distribution of the final sensitivity of the inertial sensor does not include any outliers caused by the overfitting, which prevents fatal errors with respect to the sensitivity of the inertial sensor.

In the example method according to the present invention, preferably numerous pieces of information relating to the inertial sensor are considered and the relevant features are automatically extracted without having to carry out additional complicated measurements at dedicated, specialized test stands. These pieces of information include, for example, test signals and surroundings changes, which have been obtained (from the evaluation-ASIC of the sensor) during the operating life, process tolerances, structural asymmetries and other intrinsic properties of the inertial sensor, which are very difficult to treat by linear functions. In the case of multi-axial sensors, the method according to the present invention also considers the connections between the axes due to the mechanical and electrical coupling of the various axes, which has been introduced during the design, the manufacturing process, and the packaging. In other words, the method according to the present invention utilizes pieces of information about the remaining axes in order to estimate the varied sensitivity of each axis. Thus, the sensitivity errors or sensitivity variances of an inertial sensor may be more accurately predicted according to the present invention than with the linear adaptation functions.

According to the present invention, it is also advantageous to set a first target accuracy value in the training phase of the first artificial neural network as a setpoint value for comparison with the first output accuracy value as the actual value. This ensures a desired training result for the first artificial neural network.

In one preferred specific embodiment of the method according to the present invention, it is provided that the method further includes the following steps: setting a second target accuracy value for the second artificial neural network; establishing a second output accuracy value based on a comparison result between the third output value and the test data; and storing weightings and the non-linear activation functions of the second artificial neural network and the predefined constant in the memory unit if the second output accuracy value is greater than the second target accuracy value, or training the second artificial neural network again using the training data if the second output accuracy value is lower than the second target accuracy value.

It is particularly advantageous to set a second target accuracy value during the training phase of the second artificial neural network as a setpoint value for comparison with the second output accuracy value as the actual value. This ensures a desired training result for the second artificial neural network.

In one further preferred specific embodiment of the method according to the present invention, it is provided that a statistical model is constructed based on the weightings stored in the memory unit and on the linear and/or non-linear activation functions of the first artificial neural network, on the weightings and on the non-linear activation functions of the second artificial neural network, as well as on the predefined constant. Once the inertial sensor is installed in a device, it is possible with the model to identify the sensitivity variances and to have the sensor self-calibrate.

In one further preferred specific embodiment of the method according to the present invention, it is provided that signals are detected by the inertial sensor and that the statistical model is applied by the detected signals being input into the model and the model outputting a fourth output value. This fourth output value may be used as the corrected output value of the inertial sensor according to the present invention.

In one further preferred specific embodiment of the method according to the present invention, it is provided that the detected signals are input into the first artificial neural network and into the second artificial neural network of the model in order to yield a fifth output value of the first artificial neural network and a sixth output value of the second artificial neural network.

In one further preferred specific embodiment of the method according to the present invention, it is provided that the fourth output value is established to the sixth output value if the sixth output value is within the resultant value range based on the fifth output value and on the predefined constant, or, that the fourth output value is established to the fifth output value if the sixth output value is not within the value range. A self-calibration of the inertial sensor is thus achieved.

According to one second aspect, the present invention relates to an inertial sensor for carrying out the method according to the first aspect of the present invention. The interior sensor includes at least one memory unit, a control unit, and a multiply-accumulate unit.

In one preferred specific embodiment of the inertial sensor according to the present invention, it is provided that the memory unit is configured to store the weightings and the linear and/or non-linear activation functions of the first artificial neural network, the weightings and the non-linear activation functions of the second neural network, the predefined constant and the detected signals, that the control unit is configured to generate addresses in the memory unit and to control the memory access, and that the multiply-accumulate unit is configured to multiply the detected signals or neuro outputs by the corresponding weightings and to add the corresponding products.

According to one third aspect, the present invention relates to a computer program, which includes commands which, when the program is executed by a computer, prompts the computer to carry out the method according to the first aspect of the present invention.

According to one fourth aspect, the present invention relates to a computer-readable medium, which includes commands which, when the program is executed by a computer, prompts the computer to carry out the method according to the first aspect of the present invention.

BRIEF DESCRIPTION OF THE DRAWINGS

The present invention is described in greater detail below with reference to the exemplary embodiments shown in the schematic figures.

DETAILED DESCRIPTION OF EXAMPLE EMBODIMENTS

Figure 1:
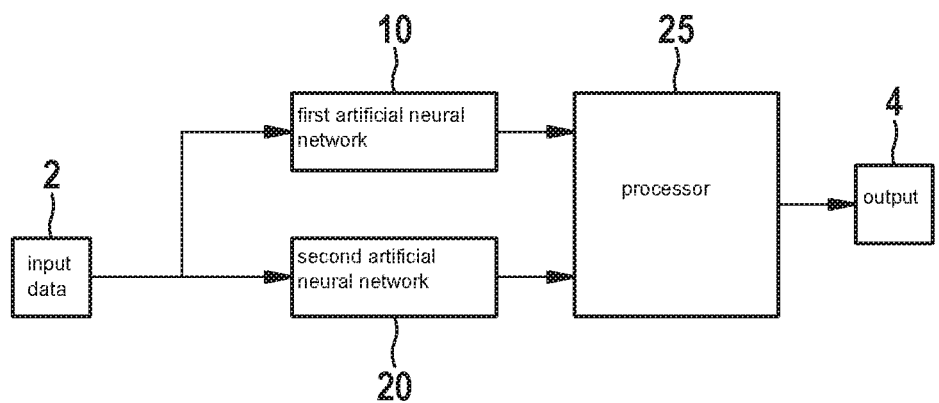
FIG. 1 shows a highly simplified block diagram of main elements of one specific embodiment of the computer-implemented method according to the present invention.
Figure 2:
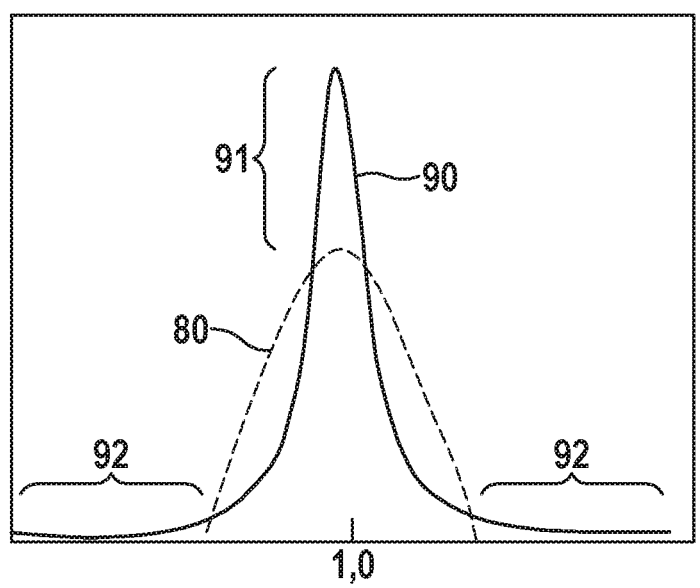
FIG. 2 shows by way of example two distributions of the calibrated sensitivity using a linear adaptation function and an artificial neural network having a non-linear activation function.

In the figures, identical reference numerals refer to identical or functionally identical elements.

The main elements of one specific embodiment of the computer-implemented method according to the present invention shown in FIG. 1 are a first artificial neural network 10, a second artificial neural network 20 and a unit 25, in particular, a processor, for controlling the limiting value of the output of second artificial neural network 20 and for establishing the final output value.

Figure 3:
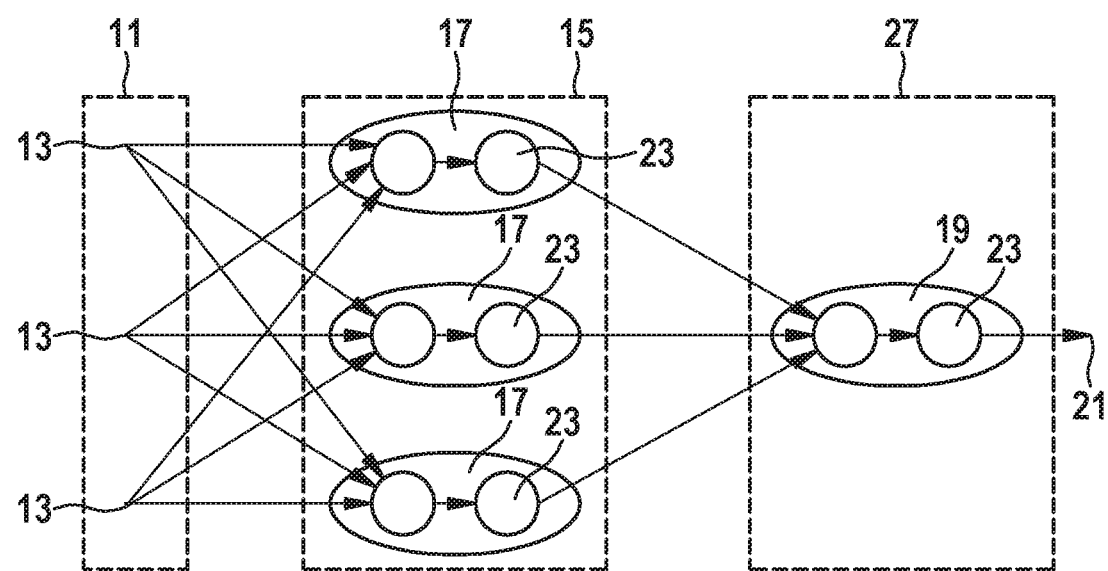
FIG. 3 shows the structure of a conventional artificial neural network.

First and second artificial neural networks 10, 20 may each be constructed based on a conventional neural network, the structure of which appears, for example, as the structure shown in FIG. 3. The conventional artificial neural network shown in FIG. 3 includes an input layer 11 having three inputs 13, a covered layer 15 having three neurons 17 and an output layer 27 having one neuron 19. The output layer of neuron 19 is identified by reference numeral 21. Each neuron has an activation function 23.

Input data 2 are fed to both first artificial neural network 10 as well as to second artificial neural network 20 (see FIG. 1). First artificial neural network 10 utilizes linear activation functions in order to generate a prediction $y_C$. Second artificial neural network 20 utilizes non-linear activation functions in order to generate a prediction $y_f$. An upper limiting value $b_U$ and a lower limiting value $b_L$ are generated in unit 25 for second neural network 20 as follows based on prediction $y_C$ and on a predefined constant $c_0$:

$$b_U = y_C + c_0,$$

$$b_L = y_C - c_0.$$

The two limiting values define the permitted range of prediction $y_f$, in which prediction $y_f$ is considered to be not overfit. Prediction $y_f$ is compared with the upper and lower limit. If prediction $y_f$ lies in between, this is accepted as valid output 4. Otherwise, prediction $y_f$ is considered to be a value having a high probability for an overfitting and is not accepted as a valid output. In this case, prediction $y_c$ is used instead as valid output 4 in order to correct the sensitivity variances.

Before the method according to the present invention, when using an inertial sensor, is used for the self-calibration of the inertial sensor, corresponding first and second artificial neural networks 10, 20 must first be trained. Available measured data are utilized for this purpose.

Figure 4:
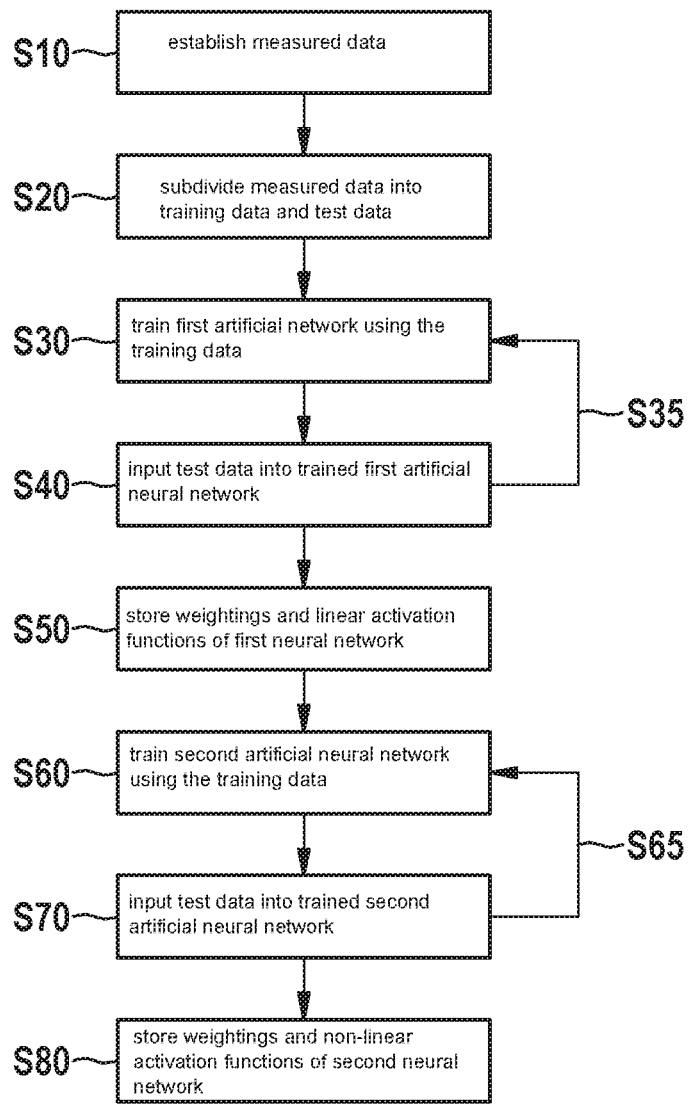
FIG. 4 shows a flowchart of one further specific embodiment of the computer-implemented method according to the present invention.

FIG. 4 shows a flowchart of one specific embodiment of the computer-implemented method according to the present invention. In step S10, the aforementioned measured data relating to the inertial sensor are established. In step S20, the measured data are subdivided into training data and test data, and a first target accuracy value is set for first artificial neural network 10. In step S30, first artificial neural network 10 is initialized, first artificial neural network 10 being trained using the training data.

In step S40, the test data are input into trained first artificial neural network 10 in order to obtain a first output value of first artificial neural network 10, and a first output accuracy value is established based on a comparison result between the first output value and the test data. In step S50, the weightings and the linear activation functions of first artificial neural network 10 are stored in a memory unit of the inertial sensor if the first output accuracy value is greater than the first target accuracy value. Otherwise, namely if the first output accuracy value is less than the first target accuracy value, first artificial neural network 10 is trained again in step S35 using the training data.

If the weightings and the linear activation functions of the first artificial neural network 10 have already been stored, an upper limiting value and a lower limiting value are established for second artificial neural network 20 based on a predefined constant and on the first output value of first artificial neural network 10. A second target accuracy value is set for second artificial neural network 20. In step S60, second artificial neural network 20 is initialized, second artificial neural network 20 being trained using the training data.

In step S70, the test data are input into trained second artificial neural network 20 in order to obtain a second output value of second artificial neural network 20. The second output value of second artificial neural network 20 is compared with a value range from the upper limiting value to the lower limiting value. A third output value or final output 4 is established as the second output value if the second output value is within the value range. Otherwise, i.e., if the second output value is not within the value range, final output 4 is established as the first output value thereof. A second output accuracy value is established based on a comparison result between the third output value and the test data. If the second output accuracy value is greater than the second target accuracy value, the weightings and the non-linear activation functions of second artificial neural network 20, as well as the predefined constant are stored in the memory unit in step S80. Otherwise, second artificial neural network 20 is trained again in step S65 using the training data.

Figure 5:
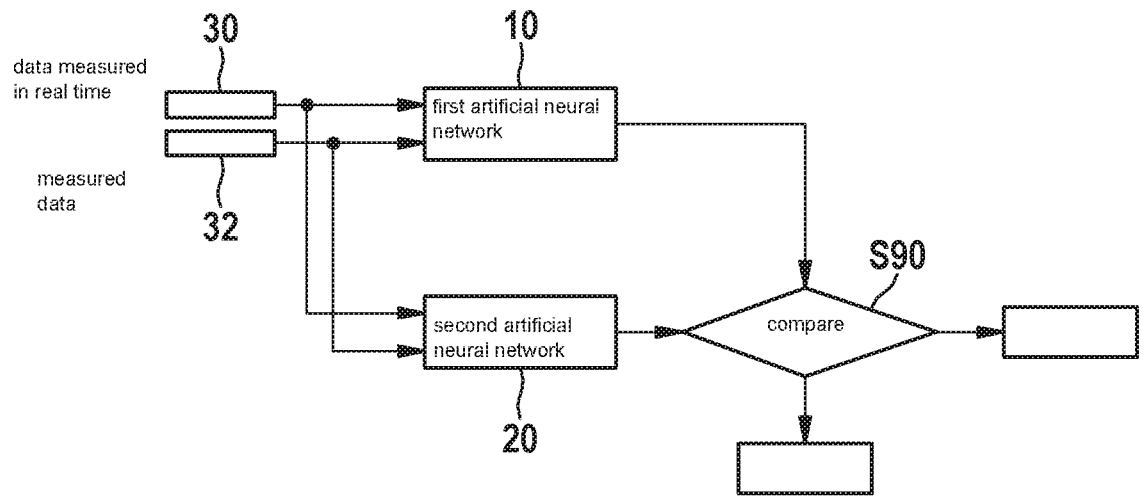
FIG. 5 shows a flowchart of one further specific embodiment of the computer-implemented method according to the present invention.

FIG. 5 shows an example of how the method according to the present invention for the self-calibration of an inertial sensor having multiple axes is used. An application-specific integrated circuit ("ASIC") of the inertial sensor measures the electrical sensitivity for each axis, and determines the instantaneous temperature and other necessary system parameters. Data 30 measured in real time and the stored parameters and measured data 32 are assembled to form an input vector. First and second artificial neural network 10, 20 generate their outputs $y_C$ and $y_F$ based the model parameters obtained during the training. Upper and lower limiting values $b_U$ and $b_L$ are also generated based on output $y_C$. A decision about the final result is made in step S90 by comparing output $y_F$ with limiting values $b_U$ and $b_L$. If output $y_F$ is between $b_U$ and $b_L$, output $y_F$ is treated as the final valid output. Otherwise, output $y_C$ is used.

Figure 6:
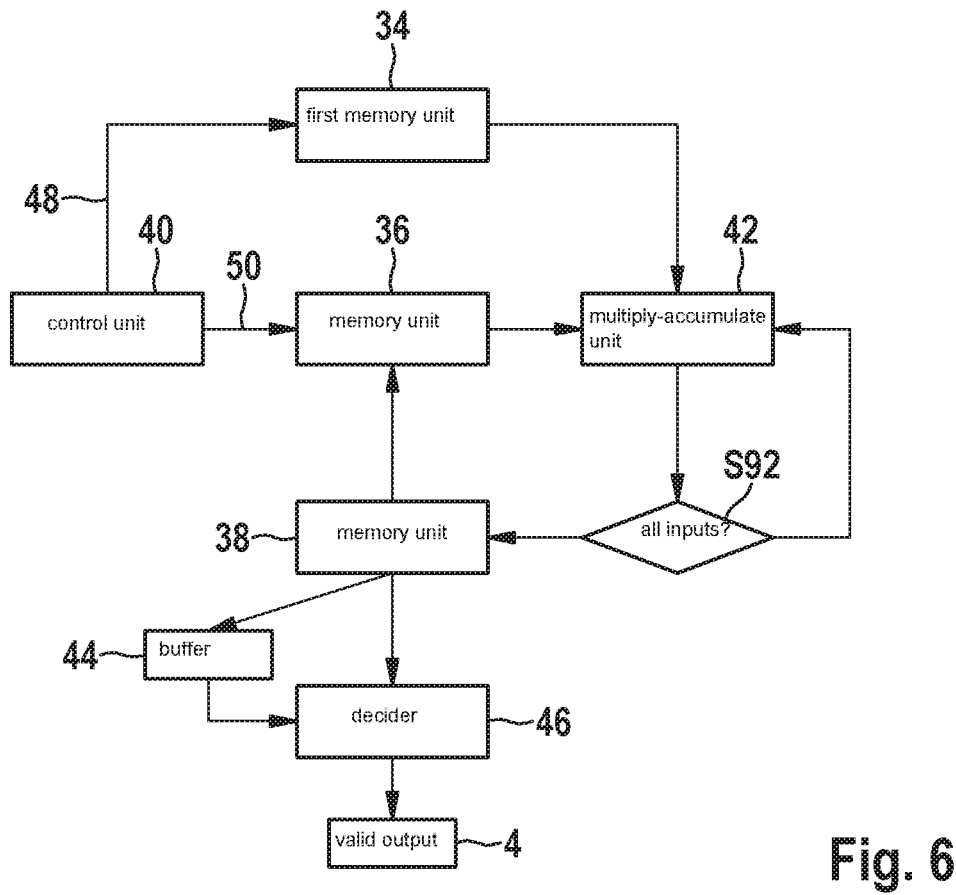
FIG. 6 shows a schematically depicted block diagram of a part of one specific embodiment of the inertial sensor according to the present invention.

FIG. 6 schematically shows a depicted block diagram of a part of one specific embodiment of the inertial sensor according to the present invention, which includes three memory units 34, 36, 38, a control unit 40, and a multiply-accumulate unit 42.

First memory unit 34 may be configured to store the weightings of the two artificial neural networks 10, 20, the predefined constant and the activation functions of first artificial neural network 10 such as Relu and/or Satlin, which have been obtained in the training process. Alternatively, simple non-linear activation functions such as Relu and/or Satlin are directly employed by programming without these having to be stored. In this way, the process is simplified. Second memory unit 36 is used during the calculation to buffer the signals detected in real time and the outputs of neurons. Third memory unit 38 is a reference table, which is configured to store the complicated non-linear activation functions such as the sigmoid function and/or the tansig function.

Control unit 40 generates addresses for memory units 34, 36, 38 and controls in each step which address is visited. Multiply-accumulate unit 42 multiplies the detected signals or the neuro outputs by their corresponding weightings and adds the product to previous products in order to form a cumulative sum.

In each step, control unit 40 generates two addresses, which are identified by reference numerals 48, 50, in order to access memory units 34, 36. Based on address 48, memory units 34 output a weighting factor $w_i$. Based on address 50, memory unit 36 generates a value $x_i$, which is either a measured value or an output of a previous neuron. Multiply-accumulate unit 42 yields a cumulative sum as follows:

$$p_{ij+1} = x_{ij} \times w_{ij} + p_{ij},$$

i and j referring to the i-th neuron and its j-th input/weighting, $p_i$ relating to the cumulative sum of all products for the i-th neuron in the j-th step. The first cumulative product sum $p_{i,0}$ for each neuron is zero. The calculation is repeated until all inputs of a neuron have been involved (see step S92). Thereafter, the end product sum of the i-th neuron is transmitted as an input to reference table 38 and, based on the stored activation function, the final output of the i-th neuron is determined as $n_i$. This value is fed to control unit 36 for the next calculation. The calculation is repeated until all neurons of the neural network have been treated. Output $y_C$ of first neural network 10 and limiting values $b_U$ and $b_L$ stored in a buffer 44 are used in order to make a final decision in a decider 46 for final output 4.

Figure 7:
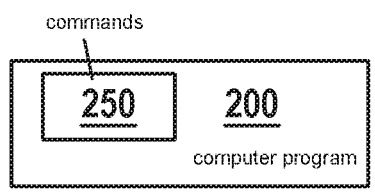
FIG. 7 shows a schematically depicted specific embodiment of the computer program according to the present invention.

The specific embodiment of computer program 200 according to the present invention depicted in FIG. 7 includes commands 250 which, when program 200 is executed by a computer, prompts the computer to carry out the method according to FIG. 4.

Figure 8:
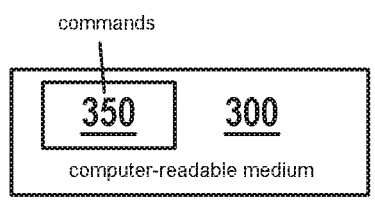
FIG. 8 shows a schematically depicted specific embodiment of the computer-readable medium according to the present invention.

The specific embodiment of computer-readable medium 300 according to the present invention depicted in FIG. 8 includes commands 350 which, when executed by a computer, prompt the computer to carry out the method according to FIG. 4.

Although the present invention has been fully described above with reference to preferred exemplary embodiments, it is not limited thereto, but is modifiable in a variety of ways. The method according to the present invention may, for example, also be applied to monitor system states in order to identify malfunctions of defective chips. The method according to the present invention may further be used to predict new system parameters.

What is claimed is:

1. A computer-implemented method for self-calibration of an inertial sensor, comprising the following steps:
   establishing data that relate to the inertial sensor having multiple axes, wherein the data includes an electrical sensitivity for each axis of the multiple axes;
   subdividing the data into training data and test data;
   setting a first target accuracy value for a first artificial neural network that includes linear and/or non-linear activation functions;
   training the first artificial neural network using the training data;
   inputting the test data into the trained first artificial neural network to obtain a first output value of the first artificial neural network;
   establishing a first output accuracy value based on a comparison result between the first output value and the test data;
   storing weightings and the linear and/or non-linear activation functions of the first artificial neural network in a memory unit of the inertial sensor when the first output accuracy value is greater than the first target accuracy value, or training the first artificial neural network again using the training data when the first output accuracy value is less than the first target accuracy value;
   establishing an upper limiting value and a lower limiting value for a second artificial neural network that includes non-linear activation functions, based on a predefined constant and on the first output value of the first artificial neural network;
   training the second artificial neural network using the training data;
   inputting the test data into the trained second artificial neural network to obtain a second output value of the second artificial neural network;
   comparing the second output value of the second artificial neural network with a value range from the upper limiting value to the lower limiting value;
   establishing a third output value to the second output value when the second output value is within the value range, or to the first output value when the second output value is not within the value range;
   storing weightings and the non-linear activation functions of the second artificial neural network and the predefined constant in the memory unit; and
   outputting the accuracy value to calibrate the sensor,
   wherein, during the training of the first artificial neural network, the first target accuracy value is set as a setpoint value for comparison with the first output accuracy value as an actual value.

2. The computer-implemented method as recited in claim 1, wherein the method further comprises the following steps:

setting a second target accuracy value for the second artificial neural network;

establishing a second output accuracy value based on a comparison result between the third output value and the test data; and storing the weightings and the non-linear activation functions of the second artificial neural network and the predefined constant in the memory unit when the second output accuracy value is greater than the second target accuracy value, or training the second artificial neural value again using the training data when the second output accuracy value is less than the second target accuracy value.

3. The computer-implemented method as recited in claim 1, wherein a statistical model is constructed based on the weightings and the linear and/or non-linear activation functions of the first artificial neural network stored in the memory unit, on the weightings and the non-linear activation functions of the second artificial neural network, and on the predefined constant.

4. The computer-implemented method as recited in claim 3, wherein signals are detected by the inertial sensor and the statistical model is applied by the detected signals being input into the model and the model outputting a fourth output value.

5. The computer-implemented method as recited in claim 4, wherein the detected signals are input into the first artificial neural network and into the second artificial neural network of the model in order to yield a fifth output value of the first artificial neural network and a sixth output value of the second artificial neural network.

6. The computer-implemented method as recited in claim 5, wherein the fourth output value is established to the sixth output value when the sixth output value is within the resultant value range based on the fifth output value and the predefined constant, or the fourth output value is established to the fifth output value when the sixth output value is not within the value range.

7. An inertial sensor, comprising:
at least one memory unit;
at least one control unit; and
at least one multiply-accumulate unit;
wherein the inertial sensor is configured to:
establishing data that relate to the inertial sensor having multiple axes, wherein the data includes an electrical sensitivity for each axis of the multiple axes;
subdivide the data into training data and test data;
set a first target accuracy value for a first artificial neural network that includes linear and/or non-linear activation functions;
train the first artificial neural network using the training data;
input the test data into the trained first artificial neural network to obtain a first output value of the first artificial neural network;
establish a first output accuracy value based on a comparison result between the first output value and the test data;
store weightings and the linear and/or non-linear activation functions of the first artificial neural network in the memory unit of the inertial sensor when the first output accuracy value is greater than the first target accuracy value, or training the first artificial neural network again using the training data when the first output accuracy value is less than the first target accuracy value;
establish an upper limiting value and a lower limiting value for a second artificial neural network that includes non-linear activation functions, based on a predefined constant and on the first output value of the first artificial neural network;
train the second artificial neural network using the training data;
input the test data into the trained second artificial neural network to obtain a second output value of the second artificial neural network;
compare the second output value of the second artificial neural network with a value range from the upper limiting value to the lower limiting value;
establish a third output value to the second output value when the second output value is within the value range, or to the first output value when the second output value is not within the value range;
store weightings and the non-linear activation functions of the second artificial neural network and the predefined constant in the memory unit; and
output the accuracy value to calibrate the sensor,
wherein, during the training of the first artificial neural network, the first target accuracy value is set as a setpoint value for comparison with the first output accuracy value as an actual value.

8. The inertial sensor as recited in claim 7, wherein the memory unit is configured to store the weightings and the linear and/or non-linear activation functions of the first artificial neural network, the weightings and the non-linear activation functions of the second artificial neural network, the predefined constant and the detected signals, the control unit is configured to generate addresses in the memory unit and to control access to the memory, and the multiply-accumulate unit is configured to multiply the detected signals or neuro outputs by corresponding weightings and to add corresponding products.

9. A non-transitory computer-readable medium on which is stored commands for self-calibration of an inertial sensor, the commands, when executed by a computer, causing the computer to perform the following steps:
establishing data that relate to the inertial sensor having multiple axes, wherein the data includes an electrical sensitivity for each axis of the multiple axes;
subdividing the data into training data and test data;
setting a first target accuracy value for a first artificial neural network that includes linear and/or non-linear activation functions;
training the first artificial neural network using the training data;
inputting the test data into the trained first artificial neural network to obtain a first output value of the first artificial neural network;
establishing a first output accuracy value based on a comparison result between the first output value and the test data;
storing weightings and the linear and/or non-linear activation functions of the first artificial neural network in a memory unit of the inertial sensor when the first output accuracy value is greater than the first target accuracy value, or training the first artificial neural network again using the training data when the first output accuracy value is less than the first target accuracy value;
establishing an upper limiting value and a lower limiting value for a second artificial neural network that includes non-linear activation functions, based on a predefined constant and on the first output value of the first artificial neural network;

training the second artificial neural network using the training data;

inputting the test data into the trained second artificial neural network to obtain a second output value of the second artificial neural network;

comparing the second output value of the second artificial neural network with a value range from the upper limiting value to the lower limiting value;

establishing a third output value to the second output value when the second output value is within the value range, or to the first output value when the second output value is not within the value range;

storing weightings and the non-linear activation functions of the second artificial neural network and the predefined constant in the memory unit; and outputting the accuracy value to calibrate the sensor, wherein, during the training of the first artificial neural network, the first target accuracy value is set as a setpoint value for comparison with the first output accuracy value as an actual value.

\* \* \* \* \*